United States Patent [19]

Canzano et al.

[11] 4,278,073
[45] Jul. 14, 1981

[54] SYSTEM, METHOD AND APPARATUS FOR STORING AND CONVERTING SOLAR ENERGY INTO HEAT AND/OR SHAFT WORK

[76] Inventors: Pasquale S. Canzano, 31 Candlewicke Rd., Dover, Del. 19901; Fred D. Canzano, 23 Wall St., Cranford, N.J. 07016

[21] Appl. No.: 36,833

[22] Filed: May 7, 1979

[51] Int. Cl.³ .............................................. F24J 3/02
[52] U.S. Cl. .................................... 126/437; 126/433; 126/452; 126/900; 60/641 A
[58] Field of Search ............... 126/433, 434, 452, 432, 126/435, 437, 900; 237/59; 60/641; 165/105

[56] References Cited

U.S. PATENT DOCUMENTS

| | | | |
|---|---|---|---|
| 2,544,474 | 3/1951 | Swanton, Jr. | 126/419 X |
| 3,152,442 | 10/1964 | Rowekamp | 126/435 X |
| 4,067,314 | 1/1978 | Bollefer | 126/419 |
| 4,068,476 | 1/1978 | Kelsey | 126/433 X |
| 4,133,183 | 1/1979 | Albertson | 126/435 X |

FOREIGN PATENT DOCUMENTS

| | | | |
|---|---|---|---|
| 2725326 | 12/1978 | Fed. Rep. of Germany | 126/433 |
| 2380448 | 10/1978 | France | 237/59 |

Primary Examiner—James C. Yeung
Assistant Examiner—Larry Jones
Attorney, Agent, or Firm—James Albert Drobile

[57] ABSTRACT

A system, method and apparatus for converting solar energy into heat and/or shaft work and employing two working fluids in admixture is described. One fluid has a relatively low boiling point and is capable of being readily converted to a vapor at low, system pressure. The other fluid has a relatively high boiling point and is not capable of being readily vaporized at low, system pressure. The mixture of fluids is passed through a solar energy absorber or collector where the fluids are heated, the lower-boiling fluid undergoing conversion at least in part to the vapor phase and the higher-boiling fluid remaining in the liquid phase. The heated fluids are passed into a disengaging zone where the vapor phase is separated from the liquid phase. Thereafter, the liquid phase is passed to an energy storage zone and the vapor phase, which consists entirely of the lower-boiling fluid, may be fed to a gas motor to generate useful shaft power. Vapor from the outlet end of the gas motor or direct from the disengaging zone also may be passed through a heat exchanger to give up at least a portion of the sensible heat, and possibly also its latent heat, to a heat exchange fluid. The lower-boiling-point fluid, which may exist in both liquid and vapor phases, is admixed with the higher-boiling, liquid phase fluid from the energy storage zone, and then either reintroduced into the solar collector or by-passed around the solar collector, depending upon the availability of solar insolation.

20 Claims, 1 Drawing Figure

SYSTEM, METHOD AND APPARATUS FOR STORING AND CONVERTING SOLAR ENERGY INTO HEAT AND/OR SHAFT WORK

BACKGROUND OF THE INVENTION (a) Field of the Invention

This invention relates to a system, method and apparatus for converting solar energy into useful heat and/or shaft work and employing two compatible working fluids in admixture, one having a relatively high boiling point and the other having a relatively low boiling point, at low, system pressures.

(b) Description of the Prior Art

The closest prior art of which the applicants are aware is U.S. Pat. No. 3,901,036 to Martin wherein two fluids, not in admixture, are employed in indirect heat exchange relationship in a solar boiler. Other patents of more general interest in this area which may be referred to are U.S. Pat. Nos. 2,544,474 and 3,178,113.

SUMMARY OF THE INVENTION

In this invention, a mixture of two compatible fluids, one having a relatively high boiling point and the other a relatively low boiling point, at low pressures, are heated in a solar energy collector. Typically, a solar panel, such as is shown for example in U.S. Pat. No. 2,544,474, is employed, although other collectors known to the art may be employed. In the solar energy collector, when the sun is shining, the two fluids are heated and the low-boiling fluid is partially or substantially completely vaporized. Both fluids are then led into a disengaging zone where the vaporized low-boiling fluid is separated from the liquid phase consisting of the hot, high-boiling fluid in liquid phase and any unvaporized low-boiling fluid. Thereafter, the vapor is introduced into one or more means for utilizing the energy derived from the sun. For example, a gas energy conversion device, such as a fluid pressure motor (e.g., a piston motor or a turbine), may be employed to produce shaft work, and/or heat may be extracted from the vapor by a heat exchanger. The hot, high-boiling fluid in liquid phase and any unvaporized low-boiling fluid are removed from the disengaging zone and led into a storage tank. After exiting from the energy utilization means (e.g. a gas energy conversion device and/or a heat exchanger), the low-boiling-point fluid is admixed with hot, high-boiling-point fluid from the storage tank in an ejector- or eductor-type mixing device, such as a Venturi mixer, and the fluid mixture is fed back to the solar energy collector.

On cloudy days or at night, the solar collector may be bypassed and the stored heat energy in the hot, high-boiling-point fluid then serves to heat and vaporize the low-boiling fluid admixed therewith. The high-boiling fluid is continuously recirculated through the system (including the solar collector) during periods of sunlight to store heat energy for nightime or cloudy-day operation.

It is a primary object of the invention to provide a new, economical and efficient system, method and apparatus for utilizing solar energy employing two compatible working fluids in admixture, one fluid having a relatively high boiling point, and the other a relatively low boiling point, at low pressures.

Another object of the invention is to provide a system, method and apparatus for utilizing solar energy wherein a mixture of relatively low- and relatively high-boiling-point fluids is heated in a solar energy absorber.

Yet a further object of the invention is to bypass the solar collector when the sun is not shining so that the relatively low-boiling-point fluid exiting the energy utilization means (e.g., a gas energy-conversion device and/or a heat exchanger) is reheated solely by the hot high-boiling fluid.

The invention will be explained and more readily understood by reference to the accompanying FIG. 1, which is a schematic fluid diagram illustrating a preferred embodiment of the invention.

DETAILED DESCRIPTION OF THE INVENTION

Figure 1:
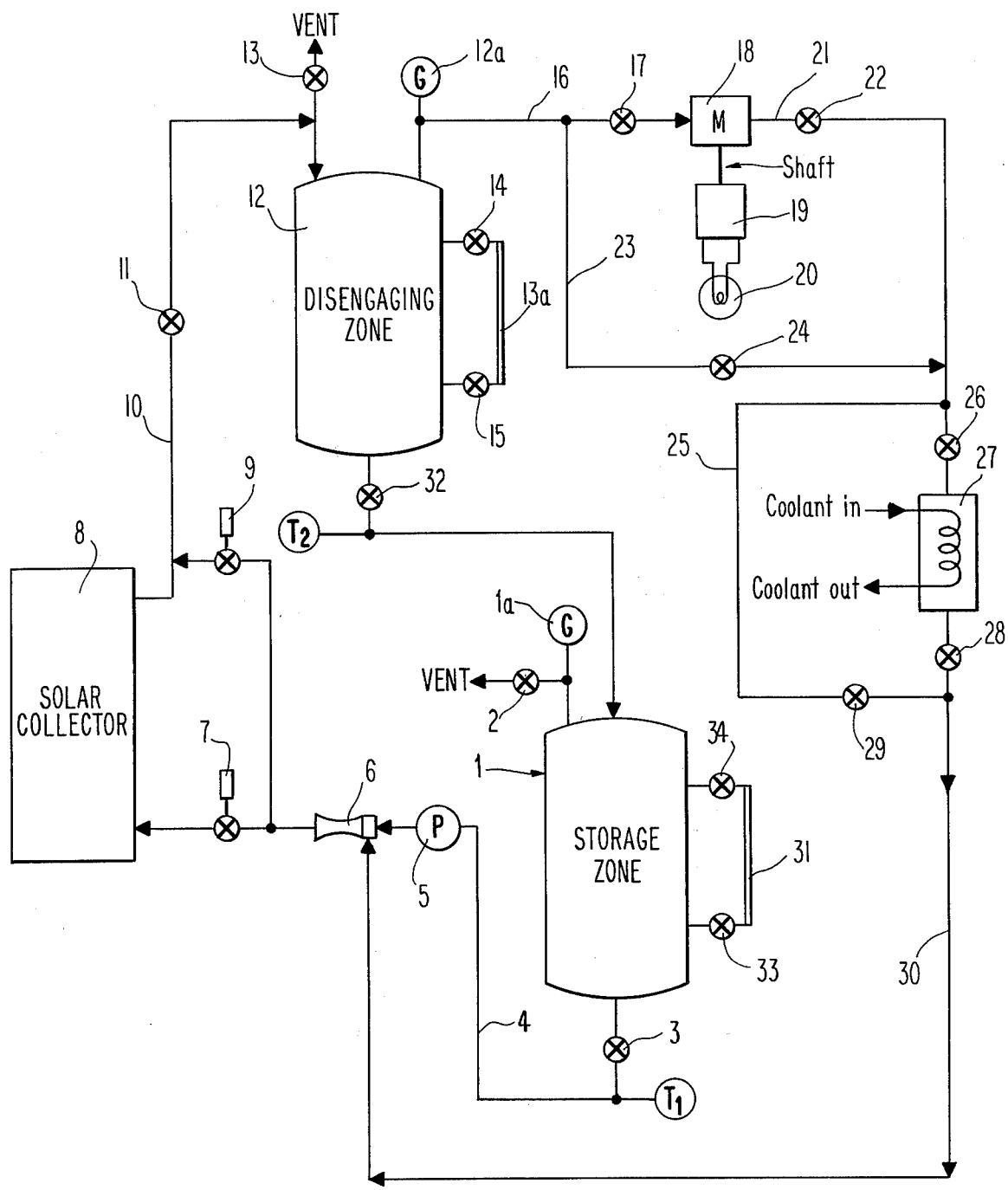

The apparatus employed in this invention comprises an energy storage tank 1, a solar heat collector 8, a vapor and liquid phase disengaging tank 12, a gas energy conversion device or gas motor 18, a heat exchanger 27, a fluid pump 5, a mixing device 6, and associated connecting lines and valves. Energy storage tank 1 having pressure gage 1-a thereon is initially charged with the two working fluids employed in the system. One fluid has a relatively low boiling point and is capable of being converted to a gas at low, system pressure. The other fluid has a relatively high boiling point at low, system pressure. Both fluids have low freezing points, good heat transfer characteristics, and are chemically compatible and nonreactive. They may be miscible or immiscible. Preferably the higher-boiling fluid has a higher density than the lower-boiling fluid, but this is not essential to the successful practice of the invention.

The relative quantities of the low-boiling-point fluid and the high-boiling-point fluid are determined by the desired shaft work and heat load, and depend also on the respective heat transfer properties of the two fluids. Typically, the weight ratio of the low-boiling-point fluid to the high-boiling-point fluid is in the range of from about 0.65 to about 0.83. However, this range is not critical and proportions outside of these limits and, in particular, substantially above the upper limit, can be utilized.

To start operations, valve 7 (conveniently, a solenoid valve) and valves 3, 11, 14, 15, 17, 22, 26, 28, 33 and 34 are opened; valve 9 (conveniently, a solenoid valve) and valves 2, 13, 24, 29 and 32 are closed. The mixture of fluids from tank 1 is passed through valve 3, line 4, pump 5, mixing device 6 and valve 7 into solar energy collector or absorber 8. If immiscible fluids are employed, appropriate means must be provided so that a suitable mixture of the two fluids is withdrawn from tank 1. These means may include stirring the liquids in the tank or withdrawing desired quantities of each of the fluids from their respective segments in the tank.

The solar collector 8, which is of conventional design and construction, is mounted outdoors and is exposed to the sun's rays. As the two fluids pass through solar collector 8, energy from the sun in the form of heat is absorbed by the collector and is transferred to both fluids simultaneously. The low-boiling-point fluid is substantially or partially converted to a vapor, while the high-boiling-point fluid is simply heated in solar collector 8 to absorb and store thermal energy and undergoes no phase change.

Optimum heat transfer coefficients are maintained in solar collector 8 by virtue of the fact that the high-boiling fluid remains in the liquid phase. Since the latter fluid does not vaporize, vapor blanketing in the collector is inhibited while allowing up to complete vaporization of the low-boiling fluid. Pressure builds up rapidly in the system as the low-boiling fluid vaporizes. Accordingly, pump 5 must have the characteristics for maintaining the required fluid flow rate at the maximum operating pressure of the system and for handling a mixture of vapor and liquid phase.

Low pressure generation of vapor is critical to the process. Depending on the particular low-boiling fluid selected, the temperatures of the vapor cycle may begin as low as 75° F. or even lower. The pressure in the system is principally determined by the formation of vapor which, in turn, depends on the temperature attained in solar collector 8. Vapor, together with any liquid-state, low-boiling fluid resulting from only partial vaporization, and the liquid-state high-boiling fluid, all now in heated condition, leave solar collector 8 by way of line 10 and valve 11 and enter disengaging tank 12 having pressure gage 12-a. Vapor leaves the top of tank 12 through line 16, while the liquid-state fluid or fluids accumulate within tank 12. The liquid level rises in tank 12 and is observed by means of sight gage 13-a, having associated valves 14 and 15. A liquid seal, which must be present at all times during continuous operation, is provided by the body of liquid between disengaging tank 12 and energy storage tank 1. Valve 32 is opened after this liquid seal is established, to allow recirculation of liquid-state, high-boiling fluid and any liquid-state, low-boiling fluid from tank 12 to tank 1. The level of liquid in tank 12 can be controlled either manually or by means of an automatic liquid-level controller with feedback to valve 32. Valves 2 and 13, as shown, enable tanks 1 and 12, respectively, to be vented when necessary.

The high-boiling liquid is continuously recirculated through the system, including solar collector 8, during periods when the sun is shining to store energy in tank 1 for use during nighttime and cloudy day operation. The level of the liquid in tank 1, as observed in sight gage 31 between valves 33 and 34, is maintained at a maximum, while the level of liquid in tank 12 is maintained at a minimum. While complete vaporization of the low-boiling fluid is desirable, this is not essential to successful practice of the invention.

As illustrated in FIG. 1, vapor under pressure leaves tank 12 by way of line 16 and valve 17, and passes through a gas energy conversion device or gas motor 18 to exit at a lower or slightly negative pressure, and then passes through line 21 and valve 22. The gas energy conversion device or gas motor is conventional and may, for example, consist of a piston motor or a turbine. In gas energy conversion device 18, the kinetic energy of the vapor is converted to shaft work. Gas motor 18 may be connected to drive an AC or DC electric power generator 19. Through practice of this invention electrical power may be generated at temperatures as low as about 90° F. and pressures as low as about 5 psig. The actual minimum operating temperatures and pressures depend on the particular low-boiling fluid employed. As shown in FIG. 1, generator 19 can be connected to a low-amperage, low-voltage device, such as a suitable light bulb 20, or can be employed to charge a storage battery (not shown). Operating conditions in gas motor 18 must be such as to inhibit condensation of the vapor therein.

The vapor exhausted from gas motor 18 still contains substantial thermal energy. This exhaust vapor may be conducted through line 21 and valves 22 and 26 to a heat exchanger 27, which preferably is designed and operated to minimize condensation of the vapor. However, if desired, the vapor can be condensed in heat exchanger 27 by proper operating conditions of temperature and pressure, e.g. a temperature of 65° F. or lower and a pressure of one atmosphere. Condensation of the vapor in heat exchanger 27 will allow maximum extraction of the thermal energy in the vapor. Gas motor 18 may be bypassed by closing valves 17 and 22 and opening valve 24, permitting the vapor to flow through line 23 and be directly admitted to heat exchanger 27. Also, heat exchanger 27 may be bypassed by opening valve 29 and closing valves 26 and 28, whereby the vapor will flow through line 25.

After exiting from the energy utilization means the low-boiling fluid is conveyed through line 30 into mixing device 6, e.g., an ejector-or eductor-type mixer, where direct mixing of the low-boiling fluid with the hot, liquid-state fluid from storage tank 1 occurs. The hot, liquid-state, high-boiling fluid is the motive fluid for mixer 6 and directly transfers heat to the low-boiling fluid to vaporize at least a part of the latter. Any vapor passing through mixing device 6 receives sensible heat or superheat from the hot high-boiling fluid. Some condensation of the vapor conceivably could occur in mixing device 6, but this does not affect the overall operation. Use of an ejector- or eductor-type mixing device, such as a Venturi mixer, eliminates the need for an additional pump and heat exchanger to vaporize the low-boiling fluid for nighttime or cloudy day operation.

Passage of the fluids through Venturi mixer 6 produces a very low or even slightly negative pressure on the discharge side of heat exchanger 27 and, consequently, on the discharge side of gas motor 18. Typically, a minimum pressure drop of about 5 psig must be maintained across gas motor 18. However, the exact value of the required minimum pressure drop will vary depending on the particular gas energy conversion device employed.

Additional mixing of the fluids is provided by the length of line 10 between the discharge end of solar collector 8 and disengaging tank 12. In summary, for daytime operation, valve 7 is opened and valve 9 is closed. For nighttime or cloudy day operation, valve 7 is closed and valve 9 can be opened, thus bypassing solar collector 8. In this latter mode of operation, the system utilizes only the thermal energy stored in the hot high-boiling fluid.

The system may be vented by opening valves 13 and 2. Thermocouple $T_1$ measures the temperature of the hot, high-boiling fluid, and thermocouple $T_2$ measures the temperature of the vapor-phase, low-boiling fluid, assuming the existence of equilibrium conditions in disengaging tank 12.

Proper operation of the system involves observing the following criteria:

The relatively low-boiling-point fluid must have a boiling point of not less than about 65° F. and not higher than about 200° F., at atmospheric pressure. This upper limit is not critical, and the lower the boiling point the more capable the fluid is to receive heat under a wide range of ambient conditions. While also not critical, the freezing point of the low-boiling fluid should be no higher than about −50° F.

The relatively high-boiling-point fluid should have a freezing point no higher than about −50° F. and a boiling point of not less than about 250° F. at atmospheric pressure. These values are not critical to successful practice of the invention, but the freezing point should be sufficiently low to avoid freezing of the fluid under winter conditions, and the boiling point must be sufficiently greater than that of the low-boiling fluid to permit the system to operate as contemplated.

The high-boiling fluid and low-boiling fluid must be nonreactive with each other in both the liquid and vapor states, and as well with air, oxygen or nitrogen, and may be miscible or immiscible. The fluids are selected from chemical compounds meeting the above criteria. Examples of the types of compounds which may be employed as the low-boiling fluid are the Freons and alcohols. Examples of the types of compounds which may be employed as of high-boiling fluids are organic heat transfer fluids such as "Dowtherm J" (Dow Chemical Company) and "Therminol" (Monsanto Chemical Company), and glycols such as ethylene glycol and propylene glycol.

A pressure drop across the gas energy conversion device or gas motor, sufficient for its operation, must be maintained. This typically will be in the neighborhood of about 5 psig or higher, but will actually depend upon the motor design. The operating temperature in the gas motor must be sufficiently higher than the boiling point of the lower-boiling-point fluid to avoid condensation in the gas motor. Typically, the operating temperature of the gas motor will be 90° F., or higher.

The system may be operated at pressures in the range of from about 5 psig to about 625 psig, and at temperatures in the range of from about 75° F. to about 390° F. The temperature at $T_1$ must be at least about 75° F., and at $T_2$ preferably is 175° F., or higher. The pressures are preferably about 60 psig at disengaging tank 12 and energy storage tank 1, while the heat exchanger 27 is at atmospheric pressure or below. While excellent results are achieved with the system working at low pressures and temperatures, satisfactory results are achieved when the system is operated at higher pressures and temperatures.

SPECIFIC EMBODIMENT OF THE INVENTION

In order to illustrate a specific embodiment of the invention, a system and apparatus generally in accord with the invention as described above and illustrated in FIG. 1 were constructed and satisfactorily operated. "Freon-11", the commercial grade of trichloromonofluoromethane (CCl$_3$F) refrigerant manufactured by the duPont Company, was employed as the relatively low-boiling fluid. The relatively high boiling fluid was "Zerex", a commercial grade of ethylene glycol antifreeze fluid. The weight ratio of the relatively low-boiling fluid to the relatively high-boiling fluid charged to the system was about 6.0, in order to ensure an excess of low boiling fluid, although such ratio typically would be in the range of from about 0.65 to about 0.83.

The pump used to transfer the fluid or fluids in liquid state from the storage vessel to the mixing device was of the progressive cavity type and was manufactured by Robbins and Myers, Ramoy Pump Division (Model Helico-301). It was driven by a ⅛ h.p. electric motor. The pump was capable of maintaining the desired fluid flow in the system at a system pressure of about 6 pounds per square inch gauge (psig). The mixing device employed was a conventional, inline Venturi mixer, and the flow rate of the admixed fluids downstream of the mixing device was about 3 liquid gallons per minute (gpm).

The solar collector was designed on the basis of a heat load of 31,000 British thermal units per hour (Btu/hr) and an assumed overall heat transfer coefficient (U) of about 300 Btu/hr-sq. ft.-°F. It was constructed of a length of about 14 feet of ½ inch diameter copper tubing, and had a heat transfer area of about 2.0 square feet. The temperature of the fluids leaving the solar collector was about 93° F., and their pressure was about 6 psig.

The vapor phase from the disengaging tank had a temperature of about 90°–93° F. and a pressure of 5–6 psig. In the embodiment, this vapor phase was conducted first through a gas energy conversion device, and thence through a heat exchanger, before being admixed with hot ethylene glycol from the storage tank for return to the solar collector.

The gas energy conversion device employed was a conventional gas motor designed for operation with air, but with seals modified for operation with trichloromonofluoromethane. It was manufactured by Gast Manufacturing Corporation and designated Model 1AM-NRV-39A. The exit pressure from the gas motor was essentially atmospheric, providing a pressure drop across the motor of about 6 psig.

The gas motor shaft was rotatably coupled to the shaft of a small motor operated as a magneto and used as a d.c. electric generator. The motor was of the type typically used in battery-powered auto models. The generator was electrically connected to a conventional 2.5 volt flashlight bulb.

The heat exchanger was identical in design and construction to the solar collector, and transferred heat directly to the ambient air. It operated essentially at atmospheric pressure.

When the above-described system and apparatus were operated in accordance with the invention during a period of sunlight, and with the admixture of working fluids passing through the solar energy collector, the lightbulb was illuminated by the d.c. electric current produced by the generator in response to the shaft work done by the gas motor. When the same system and apparatus were operated in the same way during a period of no sunlight, and with the admixture of working fluids bypassing the solar collector, the lightbulb again was illuminated. In each case, some trichloromonofluoromethane vapor was condensed in the heat exchanger, as evidenced by the appearance of liquid in the sight glass installed in the working fluid discharge line from the heat exchanger.

The invention claimed is:

1. A solar energy conversion system comprising: (a) two normally-liquid and non-reactive working fluids in admixture, the first of said fluids having a relatively low boiling point at atmospheric pressure and adapted to being readily vaporized at system operating pressures, and the second of said fluids having a relatively high boiling point at atmospheric pressure and not adapted to being vaporized at system operating pressures; (b) solar energy collection means for heating said fluids therein while exposed to sunlight and converting at least a portion of said relatively low-boiling-point fluid from the liquid state to the vapor state; and (c) a continuous circuit for said heated fluids including said collection means, disengaging means downstream of said collection means for separating said relatively low-boilingpoint fluid in hot vapor state from said fluids in hot liquid state, storage means downstream of said disengaging means for receiving and storing said fluids in hot liquid state, energy-utilization means downstreams of said disengaging means for receiving said relatively low-boiling-point fluid in hot vapor state and for utilizing at least a portion of the energy contained therein, pumping means downstream of said storage means for feeding said fluids in hot liquid state from said storage means to the solar energy collection means, and mixing means upstream of said collection means and downstream of said energy-utilization means and of said pumping means for mixing said relatively low-boiling-point fluid from said energy-utilization means and said fluids in hot liquid state from said storage means.

2. System according to claim 1 wherein said circuit also includes conduit means for selectively by-passing said solar energy collection means.

3. System according to claim 1 wherein said energy-utilization means includes gas energy conversion means for expanding said relatively low-boiling-point fluid in vapor state and for converting the work of expansion into useful shaft work.

4. System according to claim 3 wherein said circuit also includes conduit means for selectively by-passing said gas-energy conversion means.

5. System according to claim 1 wherein said energy-utilization means includes heat-exchange means for removing a portion of the heat content of said relatively low-boiling-point fluid.

6. System according to claim 4 wherein said circuit also includes conduit means for selectively by-passing said heat-exchange means.

7. System according to claim 1 wherein said energy-utilization means includes (a) gas energy conversion means downstream of said disengaging means for receiving and expanding said relatively low-boiling-point fluid in vapor state and for converting the work of expansion into useful shaft work, and (b) heat-exchange means downstream of said gas-energy conversion means for receiving the relatively low-boiling-point fluid exhausted from said gas energy conversion means and for removing a portion of the heat content thereof.

8. System according to claim 1 wherein said relatively low-boiling-point fluid has an atmospheric boiling point in the range of from about 65° F. to about 200° F. and said relatively high-boiling-point fluid has an atmospheric boiling point of at least about 250° F.

9. System according to claim 8 wherein said relatively low-boiling-point fluid is selected from the group consisting of halogenated aliphatic compounds and alkanols.

10. System according to claim 8 wherein said relatively high-boiling-point fluid is selected from the group consisting of organic heat transfer fluids and glycols.

11. A continuous process for converting solar energy into useful shaft work and heat and employing two normally-liquid and non-reactive working fluids in admixture, the first of said fluids having a relatively low boiling point at atmospheric pressure and adapted to being readily vaporized at system pressures, and the second of said fluids having a relatively high boiling point at atmospheric pressure and not adapted to being vaporized at system pressures, and said process comprising:

(a) charging said working fluids, in liquid state, into a solar energy collector while said collector is exposed to sunlight, whereby both fluids absorb heat energy and at least a portion of the heated relatively low-boiling-point fluid is converted to the vapor state while the heated relatively high-boiling-point fluid is retained substantially in the liquid state;

(b) conveying the heated vapor and liquid phases from the solar energy collector to a disengaging zone wherein the heated vapor and liquid phases from the collector are separated;

(c) conveying the hot vapor phase from the disengaging zone through energy utilization means whereby the energy contained in said vapor phase is utilized at least in part;

(d) conveying the hot liquid phase from the disengaging zone to a storage zone;

(e) mixing the hot liquid phase from the storage zone with the fluid from the energy utilization means; and (f) recirculating the admixed fluids to the solar energy collector.

12. The method of claim 11 wherein said energy-utilization means is a gas motor.

13. The method of claim 12 wherein the fluid exiting said gas motor is cooled in a heat exchanger before being admixed with the hot liquid phase from the storage zone and conveyed to the solar energy collector.

14. The method of claim 11 wherein said energy-utilization means is a heat exchanger.

15. The method of claim 11 wherein the hot liquid phase from the storage zone is pumped into a Venturi mixer and the fluid from the outlet of the energy utilization means is fed into the throat of said Venturi mixer.

16. The process of claim 11 wherein the relatively low-boiling-point fluid has a boiling point at atmospheric pressure in the range of from about 65° F. to about 200° F., and the relatively high-boiling-point fluid has a boiling point at atmospheric pressure of at least about 250° F.

17. The process of claim 16 where in said relatively low-boiling-point fluid is selected from the group consisting of halogenated aliphatic compounds and alkanols.

18. The process of claim 16 wherein said relatively high-boiling-point fluid is selected from the group consisting of organic heat transfer fluids and glycols.

19. The process of claim 16 wherein the weight ratio of said low-boiling-point fluid to said high-boiling-point fluid is from about 0.65 to about 0.83.

20. The process of claim 16 where in said low-boiling-point fluid is trichloromonofluoromethane and said high-boiling-point fluid is ethylene glycol.

* * * * *

UNITED STATES PATENT OFFICE
CERTIFICATE OF CORRECTION

PATENT NO. : 4,278,073
DATED : JULY 14, 1981
INVENTOR(S) : PASQUALE S. CANZANO and FRED D. CANZANO It is certified that error appears in the above-identified patent and that said Letters Patent are hereby corrected as shown below:

COLUMN 2, Line 11, the word "fluid" should read --flow--;

COLUMN 7, Line 31, the numeral "4" should read --5--.

Signed and Sealed this

Twenty-second Day of September 1981

[SEAL]

Attest:

GERALD J. MOSSINGHOFF

Attesting Officer　　Commissioner of Patents and Trademarks